United States Patent
Kohlhaas et al.

(10) Patent No.: US 7,487,864 B2
(45) Date of Patent: Feb. 10, 2009

(54) HYDRAULIC CIRCUIT FOR A DUAL CLUTCH TRANSMISSION

(75) Inventors: Stefan Kohlhaas, Voerde (DE); Thomas Voss, Stuttgart (DE)

(73) Assignee: Getrag Getriebe-und Zahnradfabrik Hermann Hagenmeyer GmbH & Cie KG, Untergruppenbach (DE)

( * ) Notice: Subject to any disclaimer, the term of this patent is extended or adjusted under 35 U.S.C. 154(b) by 0 days.

(21) Appl. No.: 11/649,039

(22) Filed: Jan. 2, 2007

(65) Prior Publication Data

US 2007/0170031 A1    Jul. 26, 2007

Related U.S. Application Data

(63) Continuation of application No. PCT/EP2005/007024, filed on Jun. 30, 2005.

(30) Foreign Application Priority Data

Jul. 2, 2004    (DE) ........................ 10 2004 033 362

(51) Int. Cl.
  F16D 48/02   (2006.01)
  F16D 25/10   (2006.01)
  B60W 10/02   (2006.01)
  B60W 10/10   (2006.01)
(52) U.S. Cl. .................... 192/3.58; 192/87.13
(58) Field of Classification Search .................. None
  See application file for complete search history.

(56) References Cited

U.S. PATENT DOCUMENTS

| 3,391,767 | A |   | 7/1968  | Stow |
| 5,240,093 | A | * | 8/1993  | Wagner et al. ............. 192/3.58 |
| 7,153,234 | B2|   | 12/2006 | Berger et al. |

FOREIGN PATENT DOCUMENTS

| DE | 697 02 328 T2 | 12/2000 |
| DE | 101 20 882 A1 | 10/2002 |
| DE | 101 34 115 A1 | 1/2003 |
| DE | 101 38 395 A1 | 2/2003 |
| EP | 0802 355 A3 | 3/1998 |
| FR | 2 837 431 | 3/2003 |
| GB | 880128 | 10/1961 |
| WO | WO 2006/002904 A1 | 1/2006 |

OTHER PUBLICATIONS

International Preliminary Report of patentability, Jan. 9, 2007, International Application No. PCT/EP2005/007024.

* cited by examiner

*Primary Examiner*—Rodney H Bonck
(74) *Attorney, Agent, or Firm*—Knobbe, Martens, Olson & Bear, LLP (57) ABSTRACT

A hydraulic circuit for a dual clutch transmission for motor vehicles comprises a first and a second clutch that can be hydraulically actuated and a first and a second pressure control valve for regulating the clutch pressure of the first and second clutches. In this circuit there is provided a single central valve, which in a first position connects the pressure control valves to the respective clutches and in a second position disengages the pressure control valves from the respective clutches.

23 Claims, 4 Drawing Sheets

HYDRAULIC CIRCUIT FOR A DUAL CLUTCH TRANSMISSION

CROSS-REFERENCE TO RELATED APPLICATIONS

This application is a continuation application of International Patent Application PCT/EP2005/007024 filed Jun. 30, 2005, and claims priority under 35 U.S.C. §119 from of German Patent Application DE 10 2004 033 362 filed Jul. 2, 2004.

BACKGROUND OF THE INVENTION

The present invention relates to a hydraulic circuit for a dual clutch transmission for motor vehicles, comprising a first and a second clutch that can be hydraulically actuated and a first and a second pressure control valve for regulating the clutch pressure of the first and second clutches.

Such a hydraulic circuit is generally known, for example from DE 101 34 115 A1.

Dual clutch transmissions for motor vehicles have recently attracted particular interest. They are based on the fundamental concept of conventional manual shift transmissions, but have two disengaging clutches. One disengaging clutch connects an engine output shaft to a first transmission branch, which for example comprises gear stages 1, 3, 5, . . . . The second disengaging clutch connects the engine output shaft to a second parallel transmission branch, which for example comprises gear stages 2, 4, 6, . . . .

The outputs of the two transmission branches are connected to a common output shaft, which is connected to the driving wheels of the motor vehicle.

By overlapping actuation of the disengaging clutches, it is possible to carry out gear changes from one gear to the next in an overlapping manner without interrupting the tractive force. This makes dual clutch transmissions very comfortable. Since the power transmission takes place by frictional or positive engagement, a comparatively high efficiency can be achieved at the same time.

Dual clutch transmissions can generally only be operated in an automated manner. At the same time, special safety precautions have to be taken to avoid two gear stages being selected simultaneously and simultaneously subjected to loading via the disengaging clutches. This could lead to the wheel sets and/or disengaging clutches being destroyed. The disengaging clutches are in this case generally hydraulically controlled clutches. To be precise, the disengaging clutches may be formed as dry clutches. However, it is advantageous if the disengaging clutches are formed as wet clutches, in particular as wet multi-plate clutches.

DE 101 34 115 A1, cited at the beginning, discloses a hydraulic circuit for the hydraulic control of a dual clutch transmission. In this case, the hydraulic circuit has a first partial circuit for the first disengaging clutch and the first transmission branch and a second partial circuit for the second disengaging clutch and the second transmission branch. The partial circuits are respectively connected on the input side to a hydraulic supply via release valves. The release valves are in this case formed as "failsafe" valves. In normal operation, the release valves are electrically released. In the event of failure of the electrical control, the release valves are moved by springs into a disengaging position, in which the partial circuits are disengaged from the hydraulic supply. At the same time, the partial hydraulic circuits are depressurized by connecting them to a tank. As a result, the two disengaging clutches are opened. In the case of such a malfunction, the vehicle consequently coasts and then comes to a standstill.

DE 101 38 395 A1 discloses an emergency actuating device for an automated controllable clutch which is designed such that it can be passively closed. In this case, the emergency actuating device has a pressure accumulator as an auxiliary energy store for emergency actuation.

Furthermore, DE 101 20 882 discloses the use of an arrangement comprising two check valves and a pressure limiting valve to prevent a pressure acting on the clutches from exceeding a maximum value.

BRIEF SUMMARY OF THE INVENTION

Against this background, the problem on which the invention is based is to provide an improved hydraulic circuit for a dual clutch transmission with significantly increased safety when malfunctions occur.

This problem is solved in the case of the hydraulic circuit for a dual clutch transmission mentioned at the beginning by a central valve, which in a first position connects the pressure control valves to the respective clutches and in a second position disengages the pressure control valves from the respective clutches.

Such a central or shut-off valve makes it possible when a malfunction occurs for both clutches to be disengaged virtually simultaneously from their control valves. As a result, increased freedom is obtained with regard to the further handling of a malfunction.

It is therefore generally possible by means of the central valve for both clutches to be immediately depressurized simultaneously when a malfunction occurs, as achieved by means of two upstream release valves in the case of DE 101 34 115 A1, cited at the beginning.

However, it is particularly preferred if, in emergency operation, although the clutches are disengaged from their pressure limiting valves by means of the central valve, at the same time emergency operation in which for example one of the two clutches continues to be supplied with pressure is set up. This can prevent the occurrence of a malfunction causing the driver to be abruptly deprived of any drive power. This could be critical in terms of safety in the case of an overtaking maneuver or the like. Instead of this, the clutch kept under pressure in emergency operation can ensure for example that an already initiated overtaking maneuver during which the malfunction occurs can still be completed. Accordingly, driving safety as a whole can be significantly increased.

The problem on which the invention is based is completely solved in this way.

The central valve is preferably a directional control valve.

In this way, the central valve can be realized particularly simply as a shut-off valve or shut-off slide.

Furthermore, it is advantageous if the central valve is biased into the second position by means of an energy store. In the case of this embodiment, in the event of a malfunction, which for example comprises a power failure, the central valve is automatically brought into the second position, in which the clutches are disengaged from the respective pressure control valves.

In the case of an alternative embodiment, the central valve is biased into the first position by means of an energy store.

In the case of this embodiment, the central valve is generally brought into the second position by means of a pilot valve. In this case, the pilot valve may be designed such that, in the event of a power failure, it is brought into such a position in which for example the line pressure is applied against the biasing of the central valve, in order in this way to bring the central valve reliably into the second position when the malfunction occurs.

Altogether, it is particularly preferred if the central valve in the second position also provides a pressure maintaining operating path between a line pressure side and a pressure maintaining device, which is designed for the purpose of maintaining the pressure of one of the clutches in emergency operation.

As already mentioned above, it is particularly advantageous if, although the two clutches are disengaged from their pressure control valves in emergency operation, the pressure of one of the two clutches is maintained by means of a pressure maintaining device, to be precise via the pressure maintaining operating path. The clutch which is closed in emergency operation is preferably the clutch that is "more active" when emergency operation commences. This decision may be derived from various parameters, for example the current gearshift position, etc.

However, it is of particular advantage if the pressure maintaining device has a pressure comparison device, which compares the first clutch pressure and the second clutch pressure with each other and connects the clutch with the higher clutch pressure (emergency clutch) to the pressure maintaining operating path.

In the case of this preferred embodiment, the clutch which has the higher clutch pressure at the time that the malfunction occurs is selected for emergency operation. In this case, it is assumed that this clutch is the "more active" clutch. Furthermore, it is assumed that, in the case of the active clutch, a gear selected remains selected to maintain the tractive force.

It is therefore of particular advantage if the pressure comparison device has a comparison valve, which can be hydraulically actuated by mutually opposite control surfaces, which are connected to the first and second clutch pressures.

The comparison valve accordingly forms a kind of "pressure balance" and is constantly switched over during the operation of the dual clutch transmission, depending on which clutch has the higher clutch pressure at any particular time.

According to an alternative embodiment, the pressure maintaining device has a shifting state comparison device, which compares the shifting states of a first and a second transmission branch of the dual clutch transmission with each other and connects to the pressure maintaining operating path the clutch whose assigned transmission branch has a specific shifting state (emergency clutch).

Accordingly, it is not the clutch that has the higher clutch pressure that is selected as the emergency clutch. Rather, the clutch whose assigned transmission branch is better suited for emergency operation on account of the shifting state is selected as the emergency clutch.

In the simplest case, the clutch whose transmission branch has a selected forward gear stage is chosen. Furthermore, in the case of this embodiment, emergency restarting is made possible if required.

For the case in which a gear stage is selected in both transmission branches, it is possible for example by means of control surfaces of different sizes on the comparison device for one of the two clutches always to be chosen (for example the one whose transmission branch does not include reverse gear, in order in this way to increase safety).

According to a further alternative embodiment, the pressure maintaining device always selects one particular one of the two clutches as the emergency clutch in emergency operation.

In the case of this embodiment, that clutch whose transmission branch does not include reverse gear is always selected for example as the emergency clutch. The advantage of this embodiment is a particularly simple overall construction of the hydraulic circuit.

In all embodiments, the clutch not selected as the emergency clutch is disengaged from assigned pressure control valves.

In this case, it is particularly preferred if the pressure maintaining device depressurizes the clutch that is respectively not selected as the emergency clutch, that is to say for example connects it to the tank.

Alternatively, it is therefore also possible to reduce the clutch pressure to zero in the clutch not selected as the emergency clutch by means of an existing fundamental leakage.

According to a further preferred embodiment, it is preferred overall if a hydraulic circuit portion between the central valve and the clutches has at least one pressure limiting valve for limiting the clutch pressure.

In this way it is possible to avoid that the often not insensitive clutches are protected from excessive pressure.

It is of particular advantage if the pressure maintaining device has the pressure limiting valve.

In the case of this embodiment, it is possible in a structurally simple way to limit the pressure of the two clutches by means of a single pressure limiting valve.

It is therefore particularly advantageous if the pressure limiting valve is arranged between the central valve and the comparison device and, in the first position of the central valve, respectively limits the higher clutch pressure by means of the comparison device.

Consequently, the pressure limiting valve respectively serves for limiting the pressure of the more active clutch. Since the less active clutch in any event has a lower pressure (established by the comparison device), a pressure limitation is not required there.

According to a further preferred embodiment, the pressure maintaining operating path in the pressure maintaining device is connected in parallel via an emergency throttle (for example emergency restrictor) to a hydraulic circuit portion of lower pressure.

The emergency throttle may have a number of functions. Firstly, it can be used to direct part of the volume flow from a pump for the line pressure to a hydraulic circuit portion that requires this volume flow. Secondly, it is possible to accomplish restarting in emergency operation. This is because a dynamic pressure proportional to the engine speed develops at the emergency throttle. The pressure of the activated emergency clutch can accordingly be gradually increased by giving gas, until the clutch engages again and so starting is accomplished.

It is of particular advantage if the hydraulic circuit portion of lower pressure is a clutch cooling portion.

Consequently, in emergency operation, hydraulic fluid is fed via the emergency throttle to the clutches for the purpose of cooling.

According to one embodiment, the parallel connection to the emergency throttle is set up within the central valve. This may be accomplished by a suitably provided control restrictor. In the case of this embodiment, the line to the emergency throttle via the central valve is connected to the pressure maintaining operating path when emergency operation takes place.

In the case of an alternative embodiment, the emergency throttle is arranged in a branch which can be released by an emergency throttle release valve, which is activated in parallel with the central valve.

In this case, a separate valve (emergency throttle release valve or cooling circuit valve) is provided in order to activate the emergency throttle in emergency operation. It is of particular advantage if the emergency throttle is formed in the emergency throttle release valve itself.

Altogether, it is also advantageous if a release shift valve, which releases the pressure maintaining function when safety allows, is arranged between the line pressure side and the central valve.

In the case of this embodiment, the central valve is switched in emergency operation in such a way that the clutches are disengaged from the respective pressure control valves. If safety allows, the pressure maintaining function is also released by means of the release shift valve, so that the line pressure is fed to the pressure maintaining device via the central valve in order to maintain the pressure in one of the two clutches.

In this case, it is of particular advantage if the release shift valve releases the pressure maintaining function when the higher clutch pressure is greater than a first threshold value.

In the case of this embodiment, it is assumed that only when the higher clutch pressure exceeds a specific threshold value is this clutch actually active. If the higher clutch pressure lies below the threshold value, it is assumed that this clutch is also not active, that is to say no force is transmitted to the output via this clutch. For this case, the pressure maintaining function is not released in the case of this embodiment.

In this case, the release valve may preferably be a directional control valve, the slide of which is biased into a position in which the pressure maintaining function is not released, an opposed control surface of the release shift valve being connected to a line of the pressure maintaining device in which the higher clutch pressure prevails.

In the case of this embodiment, the first threshold value is set by the biasing of the slide (for example by means of a spring).

However, the release shift valve may also—additionally or alternatively—allow itself to be manually actuated.

For example, it may be possible to actuate this release shift valve manually in the course of servicing the dual clutch transmission, in order to obtain certain functional settings.

In the case of a particularly preferred embodiment, the release shift valve is mechanically coupled to a selection lever of the dual clutch transmission, so that the release of the pressure maintaining function takes place in dependence on the position of the selection lever.

In this case, it is generally assumed that the pressure maintaining function is released if the selection lever is in a position in which a gear stage is selected, that is to say for example the position "D", as is usual in the case of automatic transmissions.

On the other hand, in this case the pressure maintaining function could be blocked as soon as the selection lever is shifted into an "N" position or into a "P" parking position.

For the case in which restarting is to be made possible (by means of the abovementioned emergency restrictor), with the vehicle at a standstill and the engine running the driver can move the selection lever from N to D for example, in order to release the pressure maintaining function. Then the dynamic pressure at the emergency restrictor could be increased by giving gas, in order in this way gradually to close the clutch that was last active and to start off in the gear selected.

According to a further preferred embodiment, a parking lock cylinder is connected between the release shift valve and the central valve.

In the case of this embodiment, a parking lock is accomplished in a simple way.

The parking lock would in this case preferably have an energy store such as a spring, which biases the parking lock into the parking position (that is to say for example enables a lock which blocks the output shaft of the dual clutch transmission).

In the released state of the release shift valve, the line pressure would act against this energy store, in order to release the parking lock. As soon as the release shift valve disables release again, the energy store of the parking lock would accordingly restore the blocking state. This embodiment is of interest in particular whenever it is combined with the embodiment in which the release shift valve is actuated by means of the selection lever.

At least one of the following advantages is realized by the hydraulic circuit according to the invention:

reduction of the number of valves;

use of the pressure comparison device for a maintaining and/or pressure limiting function;

starting by means of the "gas pedal" is possible (retaining capacity at emergency restrictor proportional to engine speed);

simplified line routing (ducting) and saving of installation space;

in the emergency operation situation, oil is used directly for clutch cooling;

with suitable circuitry, redundancy for the clutch cooling oil management can be accomplished;

the maximum system pressure can be greater than the maximum clutch pressure, so that smaller actuators and greater switching dynamics can be achieved. The clutches are in this case protected by the pressure limiting function.

The following features can be realized in the case of all or some of the embodiments of the invention:

restarting during emergency operation is possible, but can also be deliberately prevented, the pressure comparison device can set the "inferior" clutch to tank pressure during emergency operation, activation of the "possibility of the emergency operation function" can be performed deliberately with the selection lever in the transition from P to D, so that the driver can also deliberately prevent emergency operation by shifting the selection lever to N or P. For this purpose, this shift valve is not activated by the control device but operated directly by the vehicle's electrical system. Consequently, a kind of "emergency OFF function" is possible and this arrangement also allows a parking lock mechanism to be hydraulically designed and mechanically engaged.

It goes without saying that the features mentioned above and those still to be explained below can be used not only in the combination respectively specified but also in other combinations or on their own without departing from the scope of the present invention.

BRIEF DESCRIPTION OF THE SEVERAL VIEWS OF THE DRAWINGS

Exemplary embodiments of the invention are explained in more detail in the description which follows and are represented in the drawing, in which.

DETAILED DESCRIPTION OF THE INVENTION

Figure 1:
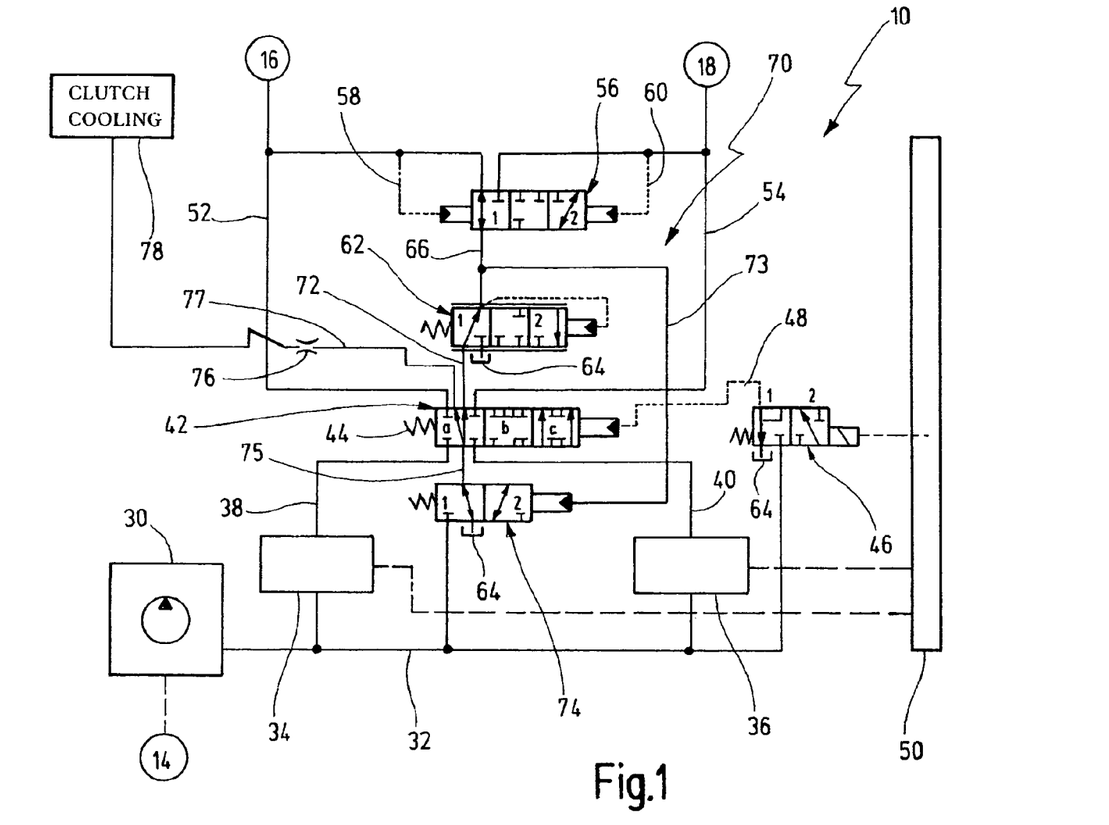
FIG. 1 shows a schematic representation of a circuit diagram of a first embodiment of the hydraulic circuit according to the invention.
Figure 1A:
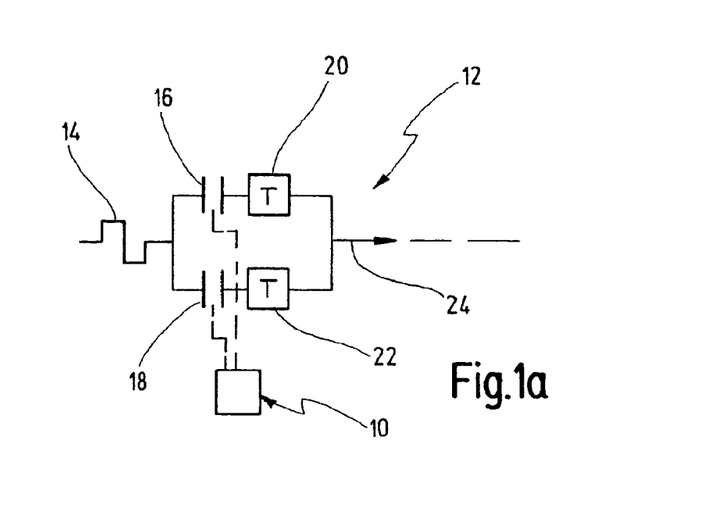
FIG. 1A shows a schematic representation of a dual clutch transmission with the hydraulic circuit according to the invention.

In FIGS. 1, 1A, a hydraulic circuit for a dual clutch transmission according to a first embodiment of the invention is designated generally by 10.

As shown in FIG. 1A, a dual clutch transmission 12 of a type known per se has two parallel disengaging clutches 16, 18, which are connected to the output of an internal combustion engine 14. Each of the two clutches 16, 18 is assigned its own transmission branch 20 and 22, respectively. The outputs of the two transmission branches 20, 22 are connected to a common output shaft 24.

The first transmission branch for example comprises the gear stages 1, 3, 5, ..., the second transmission branch 22 for example comprises the transmission stages 2, 4, 6, R, .... The function of such a dual clutch transmission 12 is generally known and is therefore not explained here for reasons of brevity.

With reference once again to FIG. 1, the hydraulic circuit 10 has a pump 30, which generates a line pressure 32. The pump 30 is generally driven by the internal combustion engine 14 by means of a chain, a toothed belt or the like. It goes without saying that the line pressure 32 is generally controlled to a specific maximum pressure. The corresponding functions of the hydraulic circuit are not included here, however, for reasons of clarity.

The hydraulic circuit 10 has a first pressure control valve 34 for the first clutch 16 and a second pressure control valve 36 for the second clutch 18. The pressure control valves 34, 36 are fed from the line pressure 32. The first pressure control valve 34 can be connected to the first clutch 16 via a first clutch line 38. The second pressure control valve 36 can be connected to the second clutch 18 via a second clutch line 40.

The hydraulic circuit 10 also has a central valve 42 in the form of a directional control valve. The central valve 42 has a first position "c" and a second position "a" (between which a blocking midway position "b" may be provided).

The central valve 42 is biased into the second position "a" by means of a spring 44.

The central valve 42 is actuated during operation by means of a pilot valve 46. The pilot valve 46 generates a control pressure which counteracts the spring 44 in a control line 48. In normal operation of the hydraulic circuit 10, this control pressure is applied to the control line 48, so that in normal operation the central valve 42 is in the first position "c".

For this purpose, the pilot valve 46 is designed as a directional control valve with two positions. In normal operation, the pilot valve 46 is actuated electromagnetically by means of a control device 50, so that the position "2", in which the control line 48 is connected to the line pressure 32, is set up. This pressure is sufficiently high to move the central valve 42 into the first position "c" against the spring 44.

In the first position "c", the first clutch line 38 is connected to the first clutch 16, so that the first clutch pressure 52, generated by the pressure control valve 34, is present in the clutch 16. In a corresponding way, in the first position "c", the second clutch line 40 is connected to the second clutch 18. Accordingly, the second clutch pressure 54, which is generated by the second pressure control valve 36, is present in the second clutch 18.

As schematically indicated, the pressure control valves are likewise controlled by the control device 50, to be precise in such a way that the operation of a dual clutch transmission can be accomplished.

The pressure control valves 34, 36 are preferably designed as directly controlled proportional directional control valves (directly controlled proportional pressure control valves are also possible), the pressure being digitally controlled by means of a controlled system and pressure sensors, although this is not represented in any more detail in FIG. 1.

The hydraulic circuit 10 also has a comparison valve 56, which is designed in the manner of a pressure balance. The comparison valve 56 is realized as a directional control valve, with two opposite control surfaces that can be hydraulically actuated. The first control surface is connected to the first clutch pressure 52 via a first control line 58. The opposite control surface is connected to the second clutch pressure 54 via a second control line 60.

The comparison valve 56 has a first position "1" and a second position "2". The first position "1" is set up when the first clutch pressure 52 is greater than the second clutch pressure 54. Conversely, the second position of the comparison valve 56 is set up when the second clutch pressure 54 is greater than the first clutch pressure 52.

The hydraulic circuit 10 also has a pressure limiting valve 62. The pressure limiting valve 62 is designed as a continuously variable directional control valve.

If the pressure in a connecting line 66 is greater than the pressure set by the pressure limiting valve 62, the connecting line 66 is connected to a tank 64. The structural design of the pressure control valve 62 is known per se and is therefore not explained in any more detail.

In the first position "1", the comparison valve 56 connects the clutch 16 to the connecting line 66. In position "2" of the comparison valve 36, the second clutch 18 is connected to the connecting line 66.

Accordingly, the higher clutch pressure 52, 54 is respectively pressure-limited by means of the pressure limiting valve 62.

This configuration dispenses with the need for a second pressure limiting valve. This is so because it is sufficient in each case to limit the higher of the two clutch pressures 52, 54. As long as the other clutch pressure lies below the limiting pressure of the pressure limiting valve 62, which will generally be the case, this is unproblematical. Should the other clutch pressure rise above the limiting pressure, the other clutch pressure would automatically become the higher clutch pressure and would then be connected to the pressure limiting valve 62 via the pressure balance 56.

Consequently, a single pressure limiting valve 62 is sufficient to realize the pressure limiting function for both the clutches 16, 18.

If the control device 50 detects a malfunction that necessitates emergency operation, the control device 50 switches off the electromagnetic actuation of the pilot valve 46. This valve is moved into position "1", which is represented in FIG. 1, by the spring biasing. In this position, the control line 48 is connected to the tank 64. This leads to the central valve 42 being moved by means of the spring 44 into the second position "a", represented in FIG. 1. The same happens if the control device 50 fails completely, for example because of a power failure. In this case too, the electromagnetic actuation of the pilot valve 46 is switched off.

In the second position "a" of the central valve 44, the two clutches 16, 18 are disengaged from their assigned pressure control valves 34, 36. This takes place virtually simultaneously by means of the central valve 42, so that overall safety is increased.

In the present embodiment of the hydraulic circuit 10, however, a pressure maintaining function is additionally realized under certain preconditions by means of a pressure maintaining device designated generally by 70. If a partial problem occurs in the area of clutch control (sensors, valves, etc.) or if the control device 50 fails, the clutch pressure in the clutch of the two clutches 16, 18 that was last active is maintained by the pressure maintaining function. Although the normal pressure control by means of the pressure control valves 34, 36 is consequently put out of action in emergency operation, the drive train can be kept closed by means of emergency operation defined in this way. It is accordingly possible for example to avoid the tractive force being interrupted during an overtaking maneuver.

In the position "a" of the central valve 42, the pressure maintaining operating path 72 is connected to a release line 75. A release shift valve 74, which is designed as a directional control valve, is provided between the release line 75 and the line pressure system 32. The release shift valve 74 is biased into a position "1", in which the release line 75 is connected to the tank 64. The opposite control surface of the release shift valve 74 is connected to a control line 73, which is connected to the connecting line 66. Accordingly, the control surface of the release shift valve 74 is subjected to the higher clutch pressure 52, 54 in each case.

If the higher clutch pressure 52, 54 is greater than a threshold value predetermined by the biasing of the release shift valve 74, the release shift valve 74 is moved into the position "2". In the position "2", the pressure maintaining function is released and the release line 75 is connected to the line pressure side 32. Accordingly, via the central valve 42 in the position "a", the pressure maintaining operating path 72, the pressure limiting valve 62, the connecting line 66 and the comparison valve 56, the line pressure 32 is passed to the clutch of the two clutches 16, 18 that had the higher clutch pressure 52, 54 at the time of the switching-over of the central valve 42.

Since the line pressure 32 is passed via the pressure limiting valve 62 to the clutch that is activated in such a way in emergency operation (emergency clutch), the pressure is actually limited to the limiting pressure set up by the pressure limiting valve 62. This avoids the clutches 16, 18 being subjected to the possibly excessive line pressure 32 during emergency operation (emergency operation).

The limiting pressure of the pressure limiting valve 62 corresponds substantially to the maximum permissible pressure with which the clutches 16, 18 can be respectively loaded. Since the line pressure 32 is generally higher, the emergency clutch is accordingly generally completely closed.

The non-activated clutch (the "inferior" clutch) remains at the pressure applicable to it when emergency operation occurs, since the lines connected to this clutch are shut-off by the central valve 42 or the comparison valve 56.

If the higher clutch pressure 52, 54 present on the connecting line 66 is less than the threshold value predetermined by the biasing of the release shift valve 74, the pressure maintaining operating path 72 is connected to the tank 64 via the central valve 42 and the release shift valve 74. The pressure maintaining function is consequently not realized.

If, for example, both clutches 16, 18 are inactive, and are consequently open, at the time that emergency operation occurs, accordingly no power is transmitted via the drive train. The vehicle is either stationary or coasts. In this case, it would make no sense to activate one of the two clutches 16, 18 by the pressure maintaining function, since, at least in the case of coasting, an unforeseen state could occur (to give one example, if a gear stage is selected in the transmission branch assigned to this clutch).

As can be seen in FIG. 1, the central valve 42 has in the position "a" a connection between the release line 75 and the pressure maintaining operating path 72 and, parallel with it, a connection between the release line 75 and the cooling circuit line 77. This parallel connection is connected via the cooling circuit line 77 to an emergency throttle (emergency restrictor) 76, which in turn is connected to a clutch cooling 78.

The emergency restrictor 76 may also be optionally integrated in a temperature-compensated configuration (for example with a bimetal restrictor).

Accordingly, over this parallel branch, a volume flow generated by the pump 30 is used in emergency operation and with the pressure maintaining function released for cooling the clutches 16, 18 via the restrictor 76. Accordingly, during emergency operation, even the regular cooling circuit could have failed. In pressure maintaining operation, the clutch cooling is accomplished by means of the pressure maintaining device 70.

By providing the emergency restrictor 76, it is thereby ensured that the volume flow generated by means of the pump 30 generally produces a sufficiently high dynamic pressure in the pressure maintaining operating path 72 to keep the emergency clutch activated, or to maintain the clutch pressure in it.

If the emergency restrictor 76 is suitably dimensioned, the following additional function can also be realized.

If the emergency restrictor 76 is dimensioned such that, when the idling speed of the engine 14 is reached, the dynamic pressure generated by means of the pump 30 in the pressure maintaining operating path 72 drops to such an extent that it goes below the threshold value set up by the release shift valve 74, the pressure maintaining function is discontinued by the biasing of the release shift valve 74. As a result, the emergency clutch is connected to the tank 64, and accordingly opened, by means of the valve arrangements.

Consequently, with suitable dimensioning of the emergency restrictor 76, it is possible to achieve opening of the emergency clutch as soon as the speed of the engine 14 has fallen into the range of idling speed.

This measure makes it possible to prevent the engine from stalling as it slows down during emergency operation. This leads to a distinct improvement in comfort, since, during emergency operation, the engine 14 can continue to run when the vehicle is finally brought to a halt. This allows equipment for providing comfortable conditions, such as for example an air-conditioning system, heater or the like, to continue to be operated in spite of the emergency operation of the hydraulic circuit 10.

Figure 2:
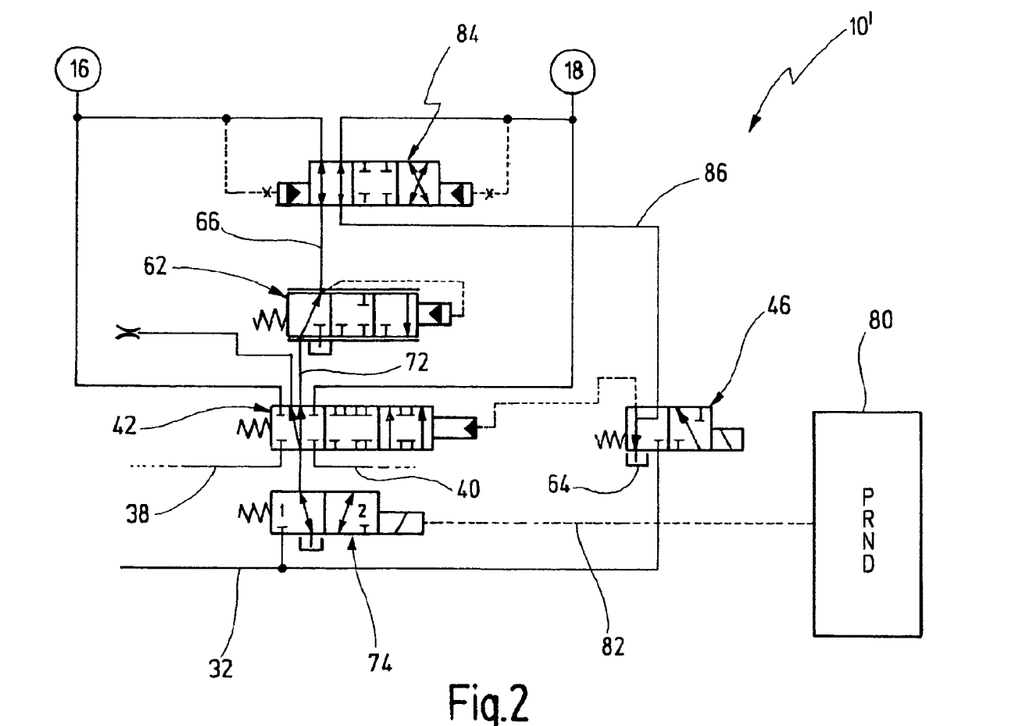
FIG. 2 shows an alternative embodiment of the hydraulic circuit according to the invention.

In FIG. 2, an alternative embodiment of the hydraulic circuit according to the invention is designated generally by 10'. The hydraulic circuit 10' corresponds in its construction and its function to the hydraulic circuit 10 of FIG. 1. Accordingly, reference is made to the description of the latter. Hereafter, only the differences are explained.

In the case of the hydraulic circuit 10', the release shift valve 74 can be actuated by means of a control line 82 or mechanically by a selection lever 80. The selection lever 80 is a lever with which it is possible at least to differentiate between driving "D" and parking "P". In the driving "D"

position (and possibly in the "R" position), the selection lever 80 is in such a position that it moves the release shift valve 74 into the position "2" against the spring biasing. In the position "P" on the other hand (and possibly in the position "N"), the release shift valve 74 is moved into the position "1", so that the pressure maintaining function is deactivated.

In the case of the hydraulic circuit 10', the pressure maintaining function is consequently activated and deactivated by the driver of the vehicle. If emergency operation occurs during driving, the selection lever 80 is in the position "D". Accordingly, the pressure maintaining function is activated and produces the effects described above.

If the driver is bringing the vehicle to a standstill, he can open the emergency clutch by switching from "D" to "N" or "P". As a result, the pressure maintaining function is deactivated. This also allows stalling of the engine 14 to be avoided even more reliably.

If, during this emergency state, the driver would like to start up again, he can reactivate the pressure maintaining function by means of the selection lever 80. By actuating the gas pedal, the speed of the engine 14 can be increased and consequently the volume flow provided by the pump 30 can be increased. Accordingly, the dynamic pressure in the pressure maintaining operating path 72 increases, to be precise in such a way that, by means of this dynamic pressure, the clutch that is selected by the comparison valve 84 (which replaces the comparison valve 56 of FIG. 1) is subjected to this dynamic pressure.

Consequently, in the case of this embodiment it is even possible to accomplish restarting in emergency operation.

Like the comparison valve 56 of FIG. 1, the comparison valve 84 is designed as a balance. However, an additional path is set up in each of the two end positions, so that the respectively "inferior" clutch is connected to the tank 64 via a return line 86, which is connected to the pilot valve 46. Accordingly, in the case of this embodiment the clutch that is in each case inferior and not selected as the emergency clutch is depressurized.

The comparison valve 84 and the return line 86 may also be used without any other modifications in place of the comparison valve 56 in the hydraulic circuit 10 of FIG. 1.

Figure 3:
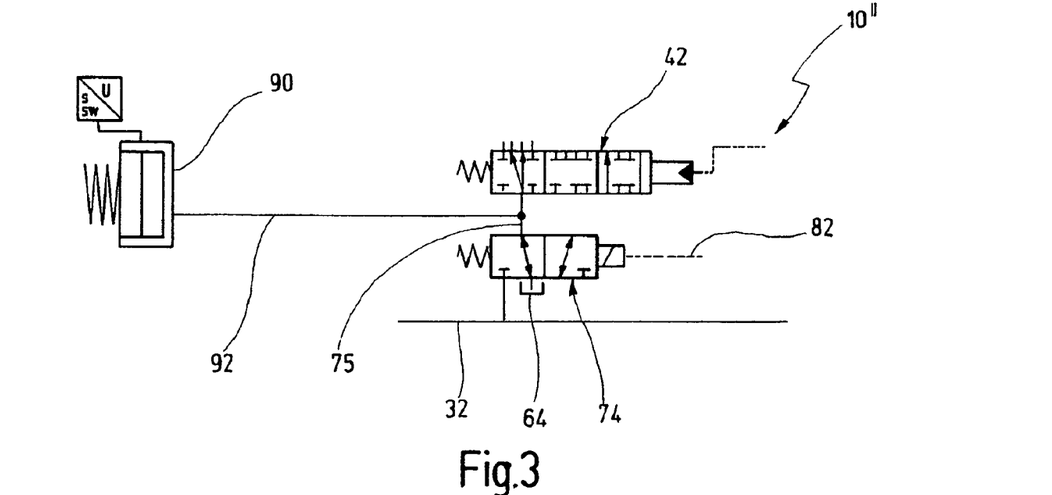
FIG. 3 shows part of a further alternative embodiment of the hydraulic circuit according to the invention.

In FIG. 3, part of a further embodiment of the hydraulic circuit according to the invention is designated generally by 10".

The hydraulic circuit 10" corresponds in its construction and its function to the hydraulic circuit 10' of FIG. 2. Hereafter, only the differences are explained.

In the case of the hydraulic circuit 10", a parking lock cylinder 90 is connected to the release line 75 via a connecting line 92.

The parking lock cylinder 90 is part of a parking lock of the dual clutch transmission 12 and is biased by means of a spring (not designated any more specifically) in a direction in which the parking lock is activated.

If the parking position "P" is selected by means of the selection lever 80, the release shift valve 74 is deactivated. The release line 75 is connected to the tank 64. Accordingly, the parking lock is engaged by means of the spring of the parking lock cylinder 90. If the selection lever 80 is used to shift to the position "D", the release line 75 is supplied with the line pressure 32, so that the parking lock cylinder 90 is deflected against the force of the spring. Accordingly, the parking lock is deactivated.

In this way, a parking lock can be accomplished by means of a simple structural design.

Figure 4:
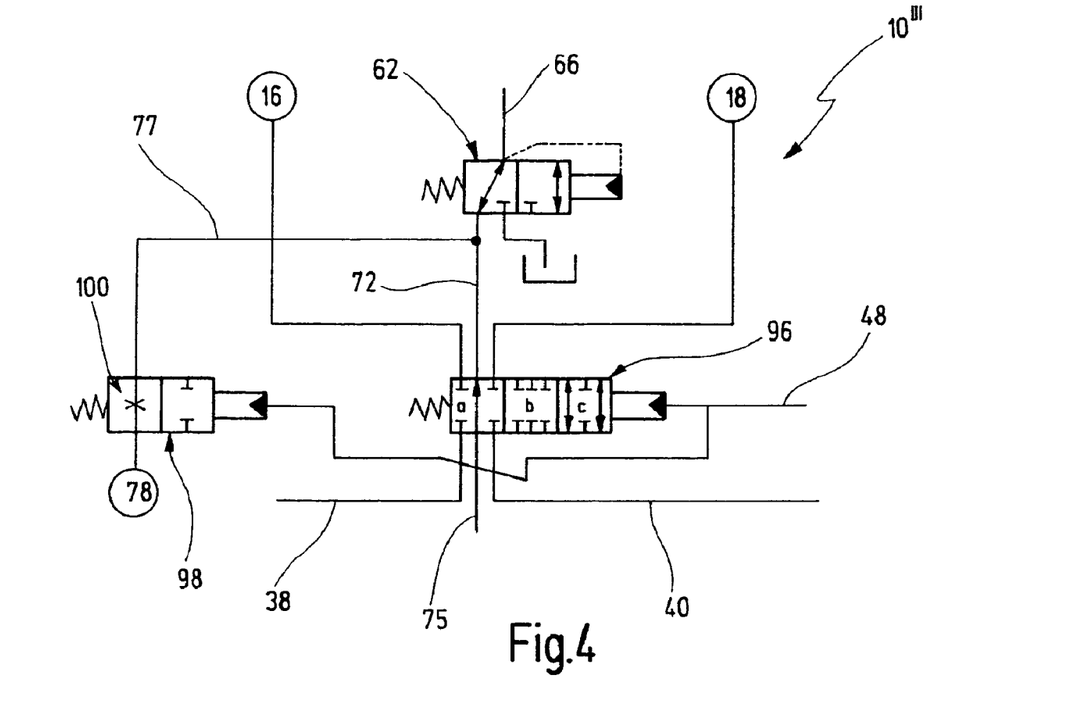
FIG. 4 shows part of a further alternative embodiment of the hydraulic circuit according to the invention.

In FIG. 4, part of a further embodiment of the hydraulic circuit according to the invention is designated generally by 10'''. The hydraulic circuit 10''' corresponds in its general construction and its general function to one of the hydraulic circuits of FIGS. 1 to 3. Hereafter, in each case only the differences are explained.

The hydraulic circuit 10''' has a central valve 96 in place of the central valve 42.

The central valve 96 differs from the central valve 42 of the previous embodiments in that, in the position "a", no parallel branch to an emergency restrictor 76 is set up.

Instead, in the case of the hydraulic circuit 10''' a cooling circuit valve 98 is provided. The cooling circuit valve 98 is activated in parallel with the central valve 96 (by means of control line 48).

In normal operation (corresponding to position "c" of the central valve 96), the cooling circuit valve 98 is accordingly in a locking position, in which it separates the cooling circuit line 77 from the clutch cooling 78.

In emergency operation (corresponding to position "a" of the central valve 96), the cooling circuit line 77 is connected to the clutch cooling 78 via an emergency restrictor 100 integrated in the cooling circuit valve 98.

The general functional mode of the emergency restrictor 100 corresponds to that of the emergency restrictor 76 of the hydraulic circuit 10 of FIG. 1.

Structural advantages can be obtained by dividing the functions of the central valve 42 in this way into the functions of the central valve 96 and the cooling circuit valve 98.

In general, it is also possible to divide the central valve 96 into two individual slides.

Figure 5:
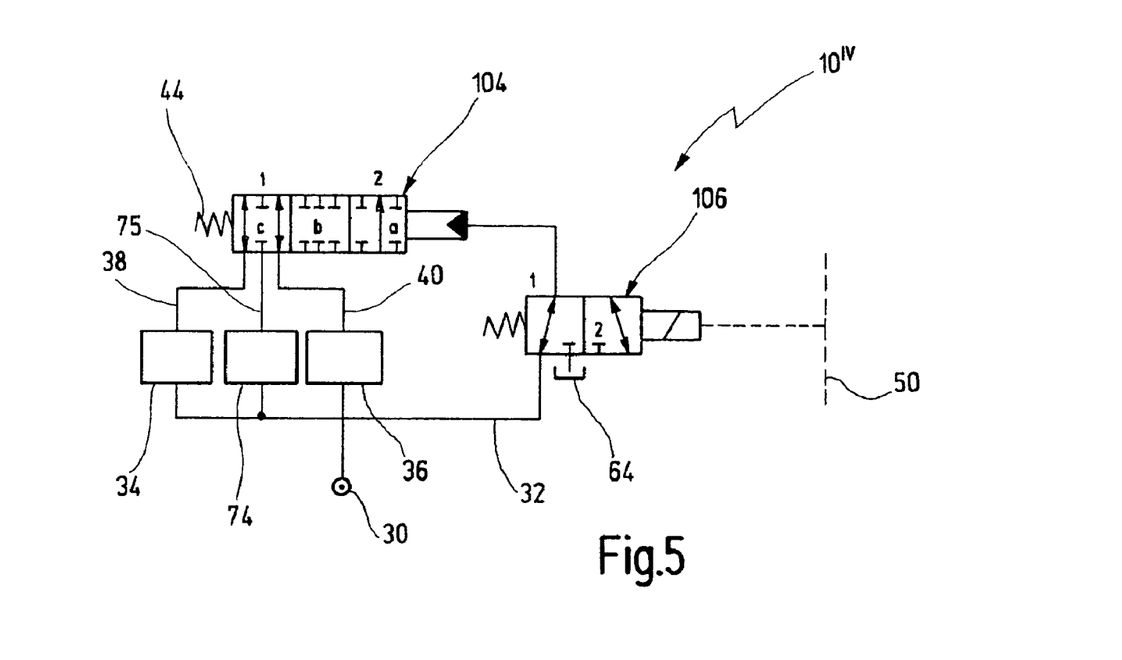
FIG. 5 shows part of a further embodiment of the hydraulic circuit according to the invention.

In FIG. 5, part of a further embodiment of the hydraulic circuit according to the invention is designated generally by 10$^{IV}$. The hydraulic circuit 10$^{IV}$ corresponds with regard to construction and function to the hydraulic circuits explained above. Hereafter, only the differences are discussed.

For instance, the hydraulic circuit 10$^{IV}$ has a central valve 104, which in normal operation is biased into the position "c" by means of a spring 44.

Instead of the pilot valve 46 of FIG. 1, the pilot valve 106 is provided. This is biased by means of a spring into a position "1", in which the line pressure 32 is connected to the opposed control surface of the central valve 104. As shown for example in FIG. 1, the opposed control surface of the pilot valve 106 is connected to the control device 50. In normal operation, the pilot valve 106 is accordingly moved into a position "2", in which the control surface of the central valve 104 is relieved (is connected to the tank 64).

Accordingly, in normal operation the position "c" is set up by means of the spring 44. If the pilot valve 106 switches over (like the pilot valve 46 of FIG. 1), the line pressure 32 is applied to the control surface of the central valve 104, so that the latter is moved into the position "a", in order to set up emergency operation.

Figures 6, 7:
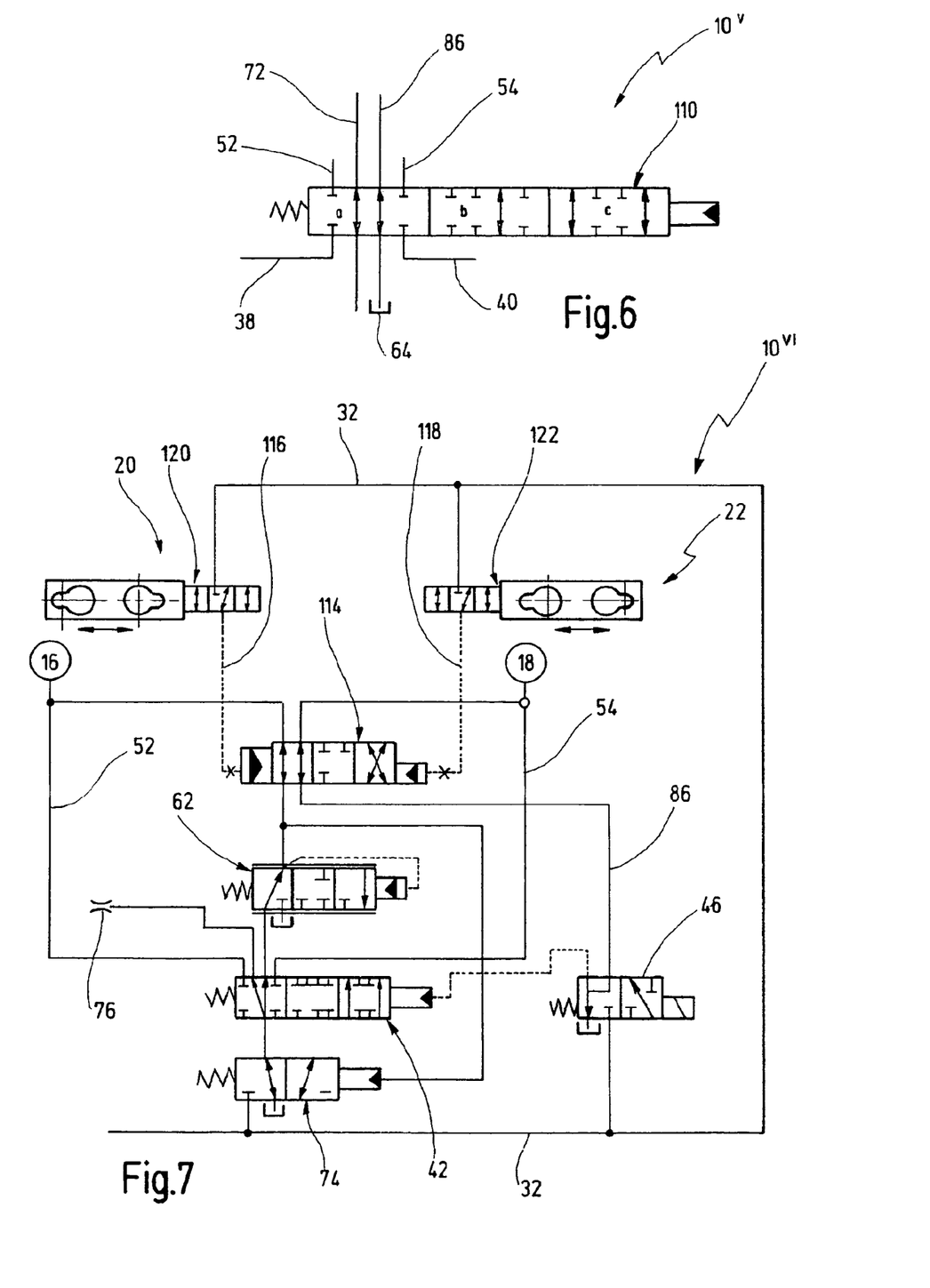
FIG. 6 shows part of a further embodiment of the hydraulic circuit according to the invention.
FIG. 7 shows a further embodiment of a hydraulic circuit according to the invention.

In FIG. 6, part of a further embodiment of the hydraulic circuit according to the invention is designated generally by 10$^{V}$.

The hydraulic circuit 10$^{V}$ corresponds with regard to construction and function to the hydraulic circuits explained above. Hereafter, only the differences are discussed.

For instance, the hydraulic circuit 10$^{V}$ has a central valve 110, which is provided instead of the central valve 42 of the hydraulic circuit 10' of FIG. 2.

As in the case of the hydraulic circuit 10', it is envisaged to relieve the inferior clutch by connecting it to the tank 64, to be precise via a line 86. By contrast with the embodiment of FIG. 2, however, the line 86 is not led to the pilot valve 46. Instead, the central valve 110 has a further path, in order to connect the line 86 to the tank 64 when emergency operation is set up. As a result, the pilot valve 46 is relieved. Furthermore, when the central valve 110 is lifted, the inferior clutch is connected to the tank 64 before the "prevailing" clutch is supplied with the maintaining pressure in emergency operation. Accordingly, the comparison valve 84 can be "stabilized" with regard to the function as a pressure balance.

In FIG. 7, a further alternative embodiment of the hydraulic circuit according to the invention is designated generally by $10^{VI}$.

The general construction and general function of the hydraulic circuit $10^{VI}$ correspond to those of the hydraulic circuits previously explained. Hereafter, only the differences are discussed.

For instance, the hydraulic circuit $10^{VI}$ has a comparison valve 114, which replaces the comparison valve 84 of the hydraulic circuit 10' of FIG. 2.

The comparison valve 114 corresponds with regard to the working connections and paths to the comparison valve 84. However, the mutually opposite control surfaces are not connected to the clutch pressures 52, 54.

For instance, the control surface of the comparison valve 114 that is assigned to the first clutch pressure 52 is connected via a control line 116 to the assigned first transmission branch 20. Correspondingly, the opposed control surface of the comparison valve 114 is connected via a control line 118 to the second transmission branch 22.

In the first transmission branch 20, a shut-off slide 120 is provided on a gearshift rod of this transmission branch, the shift positions of which slide correspond to the gear stages of the transmission branch 20. In a corresponding way, a gearshift shaft of the second transmission branch 22 is coupled to a shut-off slide 122 of a similar construction.

The shut-off slides are designed for the purpose of connecting the line pressure 32 to the control lines 116, 118 in selected positions. They may be configured as a slide valve or as a seat valve. The function of a slide may also be subdivided into a number of partial functions and corresponding partial valves.

By this measure, the comparison valve 114 is designed as a shifting-state comparison valve.

In the case of the hydraulic circuit $10^{VI}$, accordingly the clutch with the more favorable shifting state can be connected to the pressure maintaining device 70. Generally, this is the clutch whose transmission branch has a selected gear stage.

For the case in which a gear stage is respectively selected in both transmission branches 20, 22, it is provided that the first clutch 16 is always used as the emergency clutch.

This is achieved by the control surface to which the control line 116 is connected being larger than the control surface assigned to the control line 118.

In the case of this embodiment, a restarting function (by means of the dynamic pressure at the restrictor 76) can also be reliably realized, since the shifting state of the transmission can be "detected" by means of the shut-off slides 120, 122.

The shut-off slides may be made of plastic, since they do not have to perform any real shut-off tasks with respect to the shift locking. The shut-off slides may also be functionally integrated into a "transmission shut-off slide".

Apart from the various embodiments of hydraulic circuits according to the invention that are discussed above, the following modifications may be made for example:

The comparison device in the form of the comparison valve may for example be centered in the middle.

It is also possible for the comparison device to be centered on one side, one transmission branch being given preference (for example never the branch that contains reverse gear). It is also possible, as in some of the embodiments above, for the inferior clutch to be connected to the tank.

The comparison valve may also be latched, in order to avoid control fluctuations.

It is also possible to control the comparison valve by the position of possible shut-off slide plunger valves of the gear speed actuators, as is the case with the hydraulic circuit $10^{VI}$.

The central valve may be variously configured:

Without integration of an emergency restrictor, as is the case for example with the hydraulic circuit 10.

With integration of the emergency restrictor (to give one example, by integration of the valves 96, 100 into one valve).

With tank relief of the inferior clutch (cf. hydraulic circuit $10^V$).

Without tank relief of the comparison valve (cf. for example hydraulic circuit 10 of FIG. 1).

The central valve may be divided into two partial slides.

The central valve may be pre-controlled (by means of a pilot valve) or directly controlled.

The central valve may be monitored by a sensor to increase safety.

The central valve may be of a "normally closed" configuration (as in FIG. 1) or a "normally open" configuration (as in FIG. 5).

The pilot valve may relieve the pressure space at the slide by connecting it to the tank (as a 3/2-way directional control valve).

The pressure space at the central valve may be relieved by a restrictor to the tank.

The central valve may be configured as a 4/2-way shift valve.

The emergency function may be enabled as follows:

By means of a pressure-controlled release shift valve, so that below a specific clutch pressure the function is ended (cf. for example FIG. 1).

By electrical control of the release shift valve by means of the vehicle's electrical system or a selection lever (cf. for example FIG. 2).

By mechanical actuation of the release shift valve 74 by means of the selection lever (for example by means of a cable pull, similar to FIG. 2).

What is claimed is:

1. A hydraulic circuit for a dual clutch transmission for motor vehicles, comprising
    a first and a second clutch that can be hydraulically actuated and a first and a second pressure control valve for regulating the clutch pressure of the first and second clutches, respectively, and
    a single central valve, which in a first position connects the pressure control valves to the respective clutches and in a second position disengages the pressure control valves from the respective clutches.

2. The hydraulic circuit as claimed in claim 1, wherein the central valve is a directional control valve.

3. The hydraulic circuit as claimed in claim 1, wherein the central valve is biased into the second position by means of an energy store.

4. The hydraulic circuit as claimed in claim 1, wherein the central valve is biased into the first position by means of an energy store.

5. The hydraulic circuit as claimed in claim 1, wherein the central valve in the second position also provides a pressure maintaining operating path between a line pressure side and a pressure maintaining device, which is designed for the purpose of maintaining the pressure of one of the clutches in emergency operation.

6. The hydraulic circuit as claimed in claim 5, wherein the pressure maintaining device has a pressure comparison device, which compares the first clutch pressure and the second clutch pressure with each other and connects the clutch with the higher clutch pressure to the pressure maintaining operating path.

7. The hydraulic circuit as claimed in claim 6, wherein the pressure comparison device has a comparison valve, which can be hydraulically actuated by mutually opposite control surfaces, which are connected to the first and second clutch pressures.

8. The hydraulic circuit as claimed in claim 5, wherein the pressure maintaining device has a shifting state comparison device, which compares the shifting states of a first and a second transmission branch of the dual clutch transmission with each other and connects to the pressure maintaining operating path the clutch whose assigned transmission branch has a specific shifting state.

9. The hydraulic circuit as claimed in claim 5, wherein the pressure maintaining device always selects one particular one of the two clutches as an emergency clutch in emergency operation.

10. The hydraulic circuit as claimed in claim 6, wherein the pressure maintaining device depressurizes the clutch that is respectively not selected as the emergency clutch.

11. The hydraulic circuit as claimed in claim 1, wherein a hydraulic circuit portion between the central valve and the clutches has at least one pressure limiting valve for limiting the clutch pressure.

12. The hydraulic circuit as claimed in claim 11, wherein the central valve in the second position also provides a pressure maintaining operating path between a line pressure side and a pressure maintaining device, which is designed for the purpose of maintaining the pressure of one of the clutches in emergency operation, and wherein the pressure maintaining device has the pressure limiting valve.

13. The hydraulic circuit as claimed in claim 12, wherein the pressure limiting valve is arranged between the central valve and the comparison device and, in the first position of the central valve, respectively limits the higher clutch pressure by means of the comparison device.

14. The hydraulic circuit as claimed in claim 5, wherein a pressure maintaining operating path in the pressure maintaining device is connected in parallel via an emergency throttle to a hydraulic circuit portion of lower pressure.

15. The hydraulic circuit as claimed in claim 14, wherein the hydraulic circuit portion of lower pressure is a clutch cooling portion.

16. The hydraulic circuit as claimed in claim 14, wherein the parallel connection to the emergency throttle is within the central valve.

17. The hydraulic circuit as claimed in claim 14, wherein the emergency throttle is arranged in a branch which can be released by an emergency throttle release valve, which is activated in parallel with the central valve.

18. The hydraulic circuit as claimed in claim 5, wherein a release shift valve, which releases the pressure maintaining function when safety allows, is arranged between the line pressure side and the central valve.

19. The hydraulic circuit as claimed in claim 18, wherein the release shift valve releases the pressure maintaining function when the higher clutch pressure is greater than a first threshold value.

20. The hydraulic circuit as claimed in claim 18, wherein the release shift valve is a directional control valve, the slide of which is biased into a position in which the pressure maintaining function is not released, and wherein an opposed control surface of the release shift valve is connected to a line of the pressure maintaining device in which the higher clutch pressure prevails.

21. The hydraulic circuit as claimed in claim 18, wherein the release shift valve can be manually actuated.

22. The hydraulic circuit as claimed in claim 18, wherein the release shift valve is coupled to a selection lever of the dual clutch transmission in such a way that the release of the pressure maintaining function takes place in dependence on the position of the selection lever.

23. The hydraulic circuit as claimed in claim 18, wherein a parking lock cylinder is connected between the release shift valve and the central valve.

* * * * *